(12) United States Patent
Hedouin

(10) Patent No.: US 7,820,586 B2
(45) Date of Patent: Oct. 26, 2010

(54) COMPOSITION BASED ON ZIRCONIUM OXIDE AND OXIDES OF CERIUM, LANTHANUM AND OF ANOTHER RARE EARTH, A METHOD FOR PREPARING SAME AND USE THEREOF AS CATALYST

(75) Inventor: Catherine Hedouin, Gouvieux (FR)

(73) Assignee: Rhodia Operations, Aubervilliers (FR)

( * ) Notice: Subject to any disclaimer, the term of this patent is extended or adjusted under 35 U.S.C. 154(b) by 987 days.

(21) Appl. No.: 10/519,040

(22) PCT Filed: Jun. 26, 2003

(86) PCT No.: PCT/FR03/01972

§ 371 (c)(1),
(2), (4) Date: Sep. 21, 2005

(87) PCT Pub. No.: WO2004/002893

PCT Pub. Date: Jan. 8, 2004

(65) Prior Publication Data

US 2006/0115397 A1  Jun. 1, 2006

(30) Foreign Application Priority Data

Jun. 26, 2002 (FR) .................................. 02 07926

(51) Int. Cl.
| | |
|---|---|
| *B01J 21/06* | (2006.01) |
| *B01J 23/10* | (2006.01) |
| *C01F 17/00* | (2006.01) |
| *C01G 25/02* | (2006.01) |

(52) U.S. Cl. ...................... 502/302; 502/303; 502/304; 502/349; 423/21.1; 423/69; 423/71; 423/263; 423/594.12; 423/608

(58) Field of Classification Search ................ 423/21.1, 423/69, 71, 85, 411, 594.12, 608, 263; 502/302–304, 502/349

See application file for complete search history.

(56) References Cited

U.S. PATENT DOCUMENTS

| | | | |
|---|---|---|---|
| 5,057,483 A | * | 10/1991 | Wan ........................... 502/304 |
| 5,532,198 A | | 7/1996 | Chopin et al. |
| 5,723,101 A | | 3/1998 | Cuif |
| 6,214,306 B1 | | 4/2001 | Aubert et al. |
| 6,228,799 B1 | | 5/2001 | Aubert et al. |
| 6,248,688 B1 | * | 6/2001 | Wu et al. ..................... 502/302 |
| 6,255,306 B1 | | 7/2001 | Macor |
| 6,355,220 B1 | | 3/2002 | Blanchard et al. |
| 6,387,338 B1 | * | 5/2002 | Anatoly et al. ............ 423/239.1 |
| 2002/0107141 A1 | * | 8/2002 | Yoshikawa ................... 502/304 |

FOREIGN PATENT DOCUMENTS

| | | |
|---|---|---|
| EP | 0 955 267 A1 | 10/1999 |
| EP | 1 052 008 A1 | 11/2000 |
| EP | 1 053 779 A1 | 11/2000 |
| EP | 1 174 174 A1 | 1/2002 |
| WO | WO 95/35152 * | 12/1995 |
| WO | WO 97/43214 A1 | 11/1997 |
| WO | WO 03/020643 A1 | 3/2003 |

OTHER PUBLICATIONS

S. Brunauer et al., "Adsorption of Gases in Multimolecular Layers", *The Journal of the American Chemical Society*, vol. 60, Feb. 1938, pp. 309-319.

M. L. McConnell, "Particle Size Determination by Quasielastic Light Scattering", *Analytical Chemistry*, vol. 53, No. 8, Jul. 1981, pp. 1007A-1018A.

* cited by examiner

*Primary Examiner*—Timothy C Vanoy
*Assistant Examiner*—Diana J Liao
(74) *Attorney, Agent, or Firm*—Buchanan Ingersoll & Rooney, P.C.

(57) ABSTRACT

The invention concerns a composition based on zirconium and cerium oxides in an atomic ratio Zr/Ce>1, and further comprising lanthanum oxide or an oxide of a rare earth other than cerium and lanthanum. The invention is characterized in that after calcination for 6 hours at 1150 .C it has a specific surface area of not less than 10 m$_2$/g. The composition is obtained by forming a mixture containing a sol of a zirconium compound and cerium, lanthanum, said rare earth compounds, contacting said mixture with a basic compound solution, while heating and calcining the resulting precipitate. The composition can be used as catalyst.

18 Claims, No Drawings

COMPOSITION BASED ON ZIRCONIUM OXIDE AND OXIDES OF CERIUM, LANTHANUM AND OF ANOTHER RARE EARTH, A METHOD FOR PREPARING SAME AND USE THEREOF AS CATALYST

This application is an application under 35 U.S.C. Section 371 of International Application Number PCT/FR03/01972 filed on Jun. 26, 2003.

The present invention relates to a composition based on zirconium oxide and oxides of cerium, lanthanum and another rare earth, its method of preparation and its use as a catalyst.

So-called multifunctional catalysts are used at present for the treatment of the exhaust gases from internal combustion engines (automotive post-combustion catalysis). "Multifunctional" means catalysts that are able to effect not only the oxidation in particular of the carbon monoxide and hydrocarbons present in the exhaust gases but also the reduction in particular of the nitrogen oxides that are also present in these gases ("three-way" catalysts). Zirconium oxide and cerium oxide are now seen as two particularly important and advantageous constituents for catalysts of this type. To be effective, these catalysts must have a large specific surface even at elevated temperature.

There is a need for catalysts that can be used at higher and higher temperatures and, hence, with great stability of their specific surface.

The object of the invention is therefore the development of a catalytic composition that can meet this need.

For this purpose, the composition of the invention is based on zirconium oxide and cerium oxide in an atomic ratio Zr/Ce>1, in addition it comprises lanthanum oxide and an oxide of a rare earth other than cerium and lanthanum, and it is characterized in that after calcination for 6 hours at 1150° C. it has a specific surface of at least 10 $m^2/g$.

The invention also relates to a method of preparation of the aforementioned composition and this method is characterized in that it comprises the following stages:

a mixture is prepared comprising compounds of cerium, of lanthanum and of the aforementioned rare earth and a sol of a zirconium compound;

said mixture is brought into contact with a solution of a basic compound whereby a precipitate is obtained;

said precipitate is heated in an aqueous medium;

the precipitate thus obtained is calcined.

As mentioned previously, the composition of the invention has particularly high values of specific surface at a temperature of 1150° C.

Other characteristics, details and advantages of the invention will become even clearer on reading the description given below, as well as a concrete but nonlimiting example that is intended to illustrate it.

Hereinafter, specific surface means the BET specific surface determined by nitrogen adsorption according to standard ASTM D 3663-78 established on the basis of the Brunauer-Emmett-Teller method described in The Journal of the American Chemical Society, 60, 309 (1938).

Moreover, the calcinations following which the area values are given are calcinations in air.

"Rare earth" means the elements of the group comprising yttrium and the elements of the Periodic Table with atomic number between 57 and 71 inclusive.

The compositions of the invention are based on zirconium oxide and in addition they contain oxides of three other elements. These elements are cerium, lanthanum and a third rare earth that is different from cerium and lanthanum. Quite particularly, this third rare earth can be neodymium.

The compositions of the invention are further characterized by their specific surface after high-temperature calcination. Thus, after calcination for 6 hours at 1150° C., said specific surface can be at least 10 $m^2/g$, more particularly at least 15 $m^2/g$.

Said surface still has significant values after calcination for 6 hours at 1200° C., namely at least 3 $m^2/g$.

Depending on the embodiments, the compositions of the invention can also exhibit large surface areas at 900° C. after 6 hours of calcination, for example at least 50 $m^2/g$, more particularly at least 70 $m^2/g$ and even more particularly at least 75 $m^2/g$. At 1000° C., after 6 hours of calcination, said area can be at least 40 $m^2/g$, more particularly at least 55 $m^2/g$.

Furthermore, after calcination for 6 hours at 1100° C., the compositions of the invention can possibly, depending on the embodiments, have a specific surface of at least 20 $m^2/g$.

According to a particular embodiment, the compositions of the invention may be in the form of a pure solid solution of the oxides of cerium, of lanthanum and of the other rare earth in the zirconium oxide. This means that the cerium, the lanthanum and the other rare earth are entirely present in solid solution in the zirconium. The X-ray diffraction spectra of these compositions reveal in particular, within said compositions, the presence of a unique, clearly identifiable phase corresponding to that of a zirconium oxide crystallized in the cubic or quadratic system, thus reflecting the incorporation of the cerium, lanthanum and other rare earth in the crystal lattice of the zirconium oxide, and therefore the production of a true solid solution.

In this embodiment the solid solution phase is stable. By this we mean that following the calcinations at 900° C. but also at 1000° C. for said times the compositions of the invention are still in the form of this unique phase. Moreover, and according to a more particular embodiment, they can still have this structure of pure solid solution even after calcination for 6 hours at 1100° C. In other words, no demixing is observed in the temperature range from 900° C. to 1100° C.

The contents of the various elements in the compositions can vary. Said contents are expressed hereinafter as weight of oxide ($ZrO_2$, $CeO_2$, $TR_2O_3$, where TR denotes lanthanum and the other rare earth). Generally, the zirconium content is at least 50%, more particularly at least 60% and even more particularly at least 70%. The cerium content is generally less than 50%, more particularly 40% at most, and even more particularly 25% at most. The lanthanum content is usually 5% at most and more particularly it can be between 1% and 3%. Finally, the content of the rare earth can be 15% at most and more particularly it can be between 3% and 10%. In the case of compositions in the form of solid solutions, the upper limits of the contents of lanthanum and third rare earth are in fact only imposed for just the limit of solubility of these species in zirconium oxide.

Another characteristic of the compositions of the invention is that they are sulfur-free. By this we mean that the sulfur content is below 200 ppm, and preferably below 100 ppm. Said content is expressed as weight of sulfate ($SO_4$) relative to the whole composition.

The method of preparation of the compositions of the invention will now be described.

The first stage of this method comprises preparing a mixture comprising compounds of cerium, of lanthanum and of the third rare earth on the one hand and a sol of a zirconium compound on the other hand.

This mixture is usually prepared in an aqueous medium.

"Sol" means any system consisting of fine solid particles of colloidal dimensions, i.e. of dimensions between about 1 nm and about 500 nm, based on a zirconium compound, said compound generally being an oxide and/or hydroxide of zirconium, suspended in an aqueous liquid phase, said particles being able in addition, optionally, to contain residual amounts of bound or adsorbed ions, such as for example nitrates, acetates, chlorides or ammonium ions. It should be noted that, in said sol, the zirconium can be either completely in the form of colloids or in the form of ions and of colloids simultaneously.

The starting sol can be obtained notably by heat treatment or hot hydrolysis of a solution of zirconium oxychloride ($ZrOCl_2$). This treatment is generally carried out at a temperature of at least 80° C. and which can be between about 100° C. and 300° C., and preferably between 120° C. and 200° C., the concentration of the solution of zirconium oxychloride preferably being between 0.1 and 3 mol/l, more particularly between 0.5 and 2 mol/l expressed as $ZrO_2$.

The zirconium sol can also be obtained by the action of nitric acid on a hydroxide or carbonate of zirconium. To obtain a sol in the sense given above, this treatment with nitric acid must be carried out in specific conditions. Thus, the molar ratio $NO_3^-/Zr$ must be between about 1.7 and about 2.3 in the case of a hydroxide and about 1.7 and about 2 in the case of a carbonate. Above the maximum values of this ratio there is a risk of not obtaining colloids. Below the minimum value of this ratio, there is a risk that the properties of stability of surface area of the compositions will not be obtained.

Notably it is possible to use zirconium sols having an average size of colloids between 5 nm and 500 nm, and advantageously between 10 and 200 nm (The size or average hydrodynamic diameter is as determined by quasi-elastic diffusion of light according to the method described by Michael L. McConnell in the journal Analytical Chemistry 53, No. 8, 1007 A, 1981).

As compounds of cerium, of lanthanum and of rare earth that can be used in the method of the invention, we may mention for example the salts of inorganic or organic acids, notably of the sulfate, nitrate, chloride or acetate type. More particularly it is possible to use salts of cerium IV such as ceric nitrate or ammonium ceric nitrate. It should be noted that the nitrates are in general particularly suitable.

The amounts of zirconium, cerium, lanthanum and rare earth in the mixture must correspond to the stoichiometric proportions required for obtaining the desired final composition.

The second stage of the method comprises bringing the mixture obtained in the first stage into contact with a solution of a basic compound.

As basic compound we may mention products of the hydroxide or carbonate type. We may mention the hydroxides of alkali metals or of alkaline earths. It is also possible to use secondary, tertiary or quaternary amines. However, the amines and ammonia may be preferred since they lessen the risks of pollution by alkaline or alkaline-earth cations. Urea may also be mentioned.

The manner in which the mixture is brought into contact with the solution, i.e. their order of introduction, is not critical. However, this bringing into contact can be effected by introducing the mixture into the solution of the basic compound. This variant is preferable for obtaining the compositions in the form of solid solutions.

Finally it should be noted that, when the starting mixture contains a cerium compound in which the cerium is in the form of Ce III, it is preferable to use an oxidizing agent, for example hydrogen peroxide, during the procedure. This oxidizing agent can be used by being added to the reaction medium during this second stage.

The bringing into contact or reaction between the mixture and the solution, notably addition of the mixture to the solution of the basic compound, can be effected in one go, gradually or continuously, and it is preferably carried out with stirring. It is preferably carried out at room temperature. Finally, the reaction is carried out in conditions such that the pH of the medium formed is at least 7, and more particularly at least 9.

The next stage of the method is the stage of heating the precipitate in an aqueous medium.

This heating can be carried out directly on the reaction medium obtained after reaction with the basic compound or on a suspension obtained after separation of the precipitate from the reaction medium, washing if necessary and putting the precipitate back into water. The temperature to which the medium is heated is at least 40° C., more particularly at least 60° C. and even more particularly at least 100° C. The medium is thus maintained at a constant temperature for a time that is usually at least 30 minutes and more particularly at least 1 hour. Heating can be carried out at atmospheric pressure or optionally at a higher pressure.

The medium submitted to heating is preferably at basic pH.

It is possible to carry out several heating operations. Thus, the precipitate obtained after the stage of heating and optionally of washing can be resuspended in water then another heating of the medium thus obtained can be carried out. This other heating is carried out in the same conditions as those described for the first.

In a last stage of the method according to the invention, the precipitate recovered, optionally after washing and/or drying, can then be calcined. This calcination makes it possible to develop the crystallinity of the product formed, and it can also be adjusted and/or selected as a function of the intended temperature of subsequent use of the composition according to the invention, taking into account that the specific surface of the product decreases as the calcination temperature employed is raised. Said calcination is generally effected in air, but calcination carried out for example in inert gas or in a controlled atmosphere (oxidizing or reducing) is not of course excluded.

In practice, generally the calcination temperature is limited to a range of values between 300 and 1000° C.

The compositions of the invention as described above or as obtained in the method investigated previously are in the form of powders but they can optionally be formed into granules, spheres, cylinders or honeycombs of various sizes.

The invention also relates to catalytic systems comprising the compositions of the invention. For said systems, these compositions can thus be applied to any support usually used in the area of catalysis, i.e. notably thermally inert supports. Said support can be selected from alumina, titanium dioxide, cerium oxide, zirconium oxide, silica, spinels, zeolites, silicates, crystalline silicon-aluminum phosphates, crystalline aluminum phosphates.

The compositions can also be used in catalytic systems comprising a wash coat with catalytic properties and based on these compositions, on a substrate of the monolithic metallic type or of ceramic, for example. The wash coat can itself also include a support of the type of those mentioned above. This wash coat is obtained by mixing the composition with the support so as to form a suspension which can then be deposited on the substrate.

These catalytic systems and more particularly the compositions of the invention can find numerous applications. They are thus particularly suitable for, and can therefore be used in, the catalysis of various reactions such as, for example, dehydration, hydrosulfurization, hydrodenitrification, desulfurization, hydrodesulfurization, dehydrohalogenation, reforming, steam reforming, cracking, hydrocracking, hydrogenation, dehydrogenation, isomerization, disproportionation, oxychlorination, dehydrocyclization of hydrocarbons or other organic compounds, reactions of oxidation and/or reduction, the Claus reaction, treatment of the exhaust gases of internal combustion engines, demetalization, methanation, shift conversion.

In the case of these uses in catalysis, the compositions of the invention are used in combination with precious metals. The nature of these metals and the techniques of incorporating the latter in these compositions are familiar to a person skilled in the art. For example, the metals can be platinum, rhodium, palladium or iridium, and they can notably be incorporated in the compositions by impregnation.

Among the uses mentioned above, treatment of the exhaust gases of internal combustion engines (automotive post-combustion catalysis) represents a particularly interesting application. Accordingly, the invention also relates to a method of treatment of the exhaust gases of internal combustion engines that is characterized in that a catalytic system as described above or a composition according to the invention and as described previously is used as the catalyst.

An example will now be given.

EXAMPLE

This example relates to the synthesis of an oxide with the composition $ZrO_2/CeO_2/La_2O_3/Nd_2O_3$ with respective proportions by weight of 73.5/20/2.5/4.

Starting Materials Used:
The concentrations C are expressed as oxide.

| | | |
|---|---|---|
| Solution of $Ce(NO_3)_3$ | C = 29.2% | d = 1.718 g/cm³ |
| Solution of $La(NO_3)_3$ | C = 29.1% | d = 1.775 g/cm³ |
| Solution of $Nd(NO_3)_3$ | C = 26.7% | d = 1.682 g/cm³ |
| $NH_4OH$ at 20% (Prolabo) | | |
| $ZrOCl_2$ C = 24.6% as $ZrO_2$ | | |

Preparation of the Zirconium Sol

A solution of zirconium oxychloride C=24.6% as $ZrO_2$ is prepared first. The solution is then treated in an autoclave at 160° C. for 8 hours with stirring (80 rev/min). The suspension thus obtained is centrifuged at 3500 rev/min then peptized (the content of zirconium oxide is 38%).

Preparation of the Oxide $ZrO_2/CeO_2/La_2O_3/Nd_2O_3$

The zirconium sol thus synthesized is dispersed in 350 ml of water and then all of the solutions of cerium, lanthanum and neodymium nitrate are added to it with stirring for 10 minutes.

In parallel, 500 ml of ammonia solution is placed in a 1-liter reactor. The previously prepared suspension is added to this solution at a flow rate of 10 ml/min. At the end of addition the pH is 10.5. The precipitate is centrifuged (v=4500 rev/min) then resuspended in 760 ml of ammonia water at pH=10.5 and centrifuged again. The operation is repeated three times. The cake thus obtained is resuspended in 760 ml of ammonia water and is stirred (v=300 rev/min) for 2 hours at 150° C. After cooling, the suspension is centrifuged then washed in the presence of ammonia water (pH=10.5) in the conditions described previously. This operation is repeated three times then the cake obtained is resuspended at a concentration of 100 g/l of oxide and atomized with the Buchi®. The air inlet and outlet temperatures of the Buchi® are equal to 250° C. and 110° C. respectively.

The dried solid is then calcined in a muffle furnace for 4 h at 900° C. (rate of temperature rise 1° C./min).

Specific Surfaces

The surface areas of the product obtained after calcination at different temperatures are shown below.

4 h 900° C.: 77 m²/g; 10 h 1000° C.: 55 m²/g; 10 h 1100 C: 23 m²/g; 10 h 1150° C.: 16 m²/g; 10 h 1200° C.: 3.5 m²/g.

The X-ray diffraction pattern of the composition after calcination at 900° C. and 1000° C. shows that it is in the form of a solid solution corresponding to a tetragonal zirconium oxide.

The invention claimed is:

1. A composition based on zirconium oxide comprising cerium oxide in an atomic ratio Zr/Ce>1, and further comprising lanthanum oxide and an oxide of a rare earth other than cerium and lanthanum, the composition having a sulphur content below 200 ppm, wherein after calcination for 6 hours at 1150° C. it has a specific surface of at least 10 m²/g.

2. The composition as claimed in claim 1, wherein after calcination for 6 hours at 1150° C. the composition has a specific surface of at least 15 m²/g.

3. The composition as claimed in claim 1, wherein after calcination for 6 hours at 1200° C. the composition has a specific surface of at least 3 m²/g.

4. The composition as claimed in claim 1, wherein after calcination for 6 hours at 900° C. the composition has a specific surface of at least 50 m²/g.

5. The composition as claimed in claim 1, wherein after calcination for 6 hours at 1000° C. the composition has a specific surface of at least 40 m²/g.

6. The composition as claimed in claim 1, wherein the rare earth is neodymium.

7. The composition as claimed in claim 1, wherein the contents by weight of oxides are at least 50% for zirconium, less than 50% for the oxide of cerium, 5% at most for lanthanum and 15% at most for the rare earth.

8. The composition as claimed in claim 1, having a sulphur content below 100 ppm.

9. A catalytic system, comprising a composition as defined in claim 1.

10. The composition as claimed in claim 1, wherein the composition comprises a solid solution of the cerium oxide, the lanthanum oxide, and the oxide of the other rare earth, in the zirconium oxide.

11. The composition as claimed in claim 10, wherein the zirconium oxide is crystallized in a cubic or quadratic system.

12. The composition as claimed in claim 7, wherein the contents by weight of oxides are at least 70% for zirconium, at most 25% for cerium, 1% to 3% for lanthanum, and 3%-10% for the other rare earth.

13. A method of preparation of a composition as claimed in claim 1, comprising the steps of:
  a) preparing a mixture comprising compounds of cerium, of lanthanum and of the aforementioned rare earth and a sol of a zirconium compound;
  b) adding to the mixture of step a) a solution of a basic compound whereby a precipitate is obtained;
  c) heating said precipitate in an aqueous medium; and
  d) calcining the precipitate thus obtained in step c).

14. The method as claimed in claim 13, wherein the sol of a zirconium compound of step a) is obtained by heat treatment of an aqueous solution of a zirconium oxychloride.

15. The method as claimed in claim 13, wherein the sol of a zirconium compound of step a) is obtained by the action of nitric acid on a hydroxide or carbonate of zirconium in a molar ratio $NO_3^-/Zr$ between 1.7 and 2.3 in the case of a hydroxide and 1.7 and 2 in the case of a carbonate.

16. The method as claimed in claim 13, wherein in step c) the precipitate is heated at a temperature of at least 100° C.

17. The method as claimed in claim 13, wherein in step c) the heating of the precipitate is carried out at basic pH.

18. A method of treatment of the exhaust gases of internal combustion engines, comprising the step of treating said gases with a catalytic composition as claimed in claim 1.

* * * * *